United States Patent [19]

Vertucci

[11] 4,136,890
[45] Jan. 30, 1979

[54] COMBINATION LEG SHIELD AND CRASH BAR FOR MOTORCYCLES

[75] Inventor: Nicholas E. Vertucci, Farmingdale, N.Y.

[73] Assignee: William Chillianis, Flushing, N.Y.

[21] Appl. No.: 826,258

[22] Filed: Aug. 19, 1977

[51] Int. Cl.² .............................................. B62J 17/00
[52] U.S. Cl. ................................ 280/289 S; 296/78.1
[58] Field of Search ........... 280/289 R, 289 G, 289 S; 296/78.1

[56] References Cited

U.S. PATENT DOCUMENTS

| | | | |
|---|---|---|---|
| 1,374,475 | 4/1921 | Shaughnessy | 296/78.1 |
| 1,431,866 | 10/1922 | Bacchi | 296/78.1 |
| 2,564,800 | 8/1951 | Bates | 296/78.1 |
| 2,792,899 | 5/1957 | Piatti | 296/78.1 X |

Primary Examiner—Richard A. Bertsch
Assistant Examiner—Michael Mar
Attorney, Agent, or Firm—Bernard Stimler

[57] ABSTRACT

A light weight, inexpensive leg shield for motorcyles, allowing for stability and safety of riding, free movement of the legs, yet providing protection for the rider from wind, rain, mud, water, cold, insects. The leg shield is mounted in combination with the crash bar by means of clamps and is aesthetically pleasing.

2 Claims, 3 Drawing Figures

U.S. Patent  Jan. 30, 1979  4,136,890
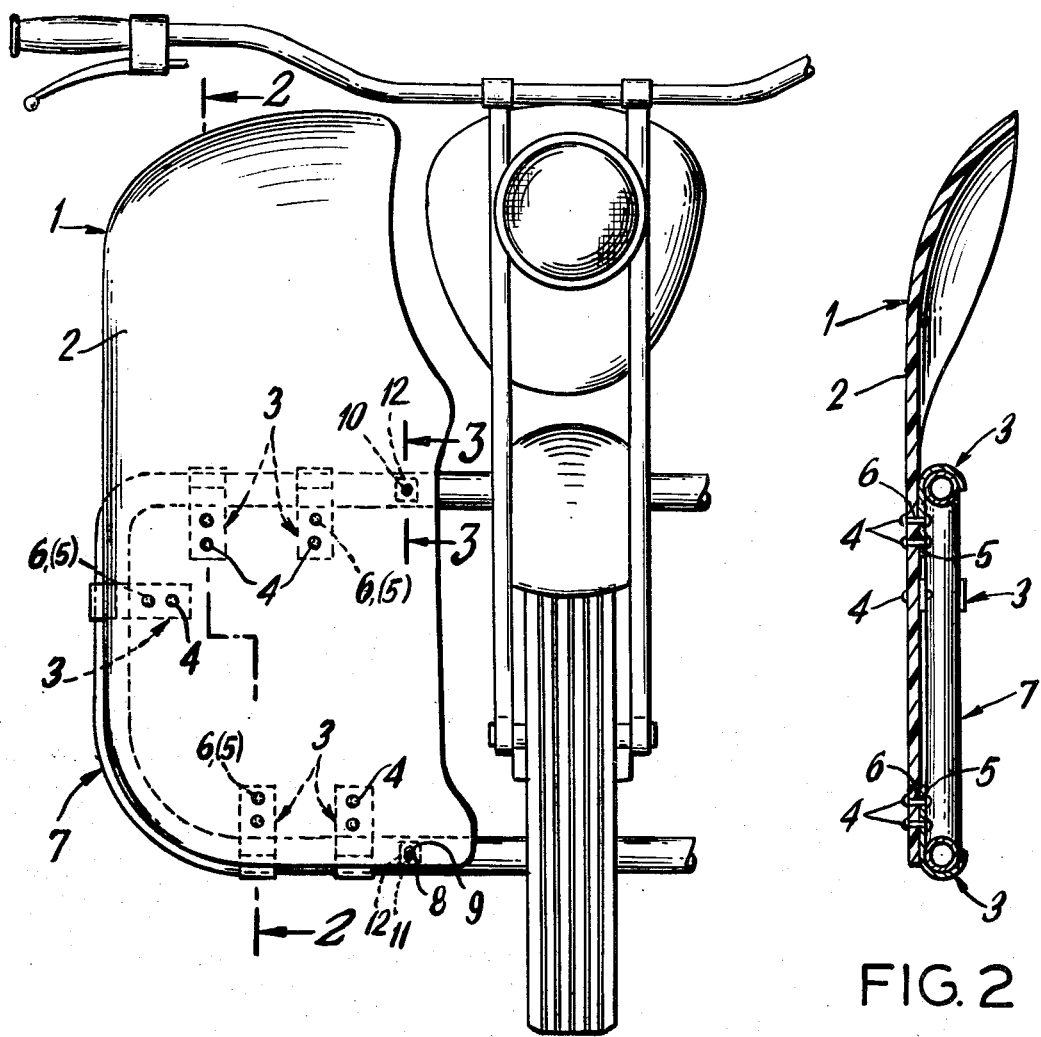
FIG. 1
FIG. 2
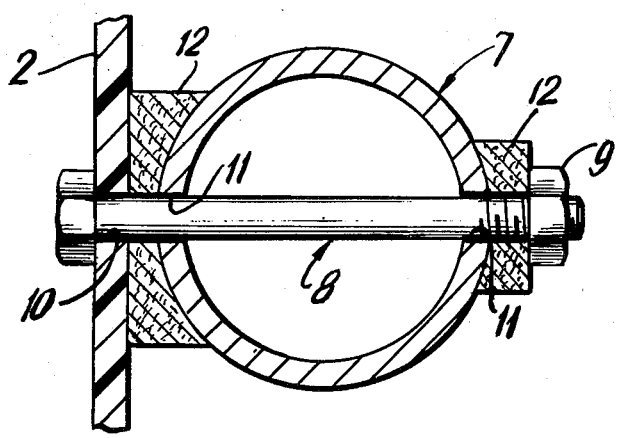
FIG. 3

COMBINATION LEG SHIELD AND CRASH BAR FOR MOTORCYCLES

FIELD OF THE INVENTION

This invention relates to a light weight, inexpensive leg shield, for use on motorcycles especially for touring and commuting, providing no loss of riding stability, and in particular a shield which allows for complete freedom of movement of the leg by providing no constraints within which the leg must remain positioned yet protecting the rider from wind, rain, mud, water, cold, insects, etc., and the mounting of the leg shield in combination with the crash bar of the motorcycle by means of clamps. This device also has a special appearance which encourages their use by motorcycle riders.

BACKGROUND OF THE INVENTION

Motorcycles continue to increase in popularity. Simplicity and attractiveness of design is important to the purchaser of motorcycle equipment. Motorcycles have not been provided with leg shields as standard equipment because of the high cost and bulkiness of the shield or fairing or because of the cumbersome attachment devices, special frames or brackets required. Such assemblies add weight, make shield replacement difficult, are not aesthetically pleasing and provide less safety and freedom of movement to the rider. Bulky fairings are also unattractive as the motorcycle takes on the appearance of a scooter.

The instant invention overcomes the disadvantages of these prior art structures by providing an improved leg shield of lightweight design, inexpensive to manufacture, providing ease of installation and removal, sleekness of style, easily packaged and displayed, with little wind braking or lateral wind effects and increased stability, safety and freedom of movement to the rider. The rider is protected in all handlebar positions during commuting or touring. The leg shield is of unique construction wherein the curvature is provided at the upper portion and bends toward the rear of the motocycle, thus utilizing the effects of an aerodynamic lifting force when the motorcycle is being driven forward which tensions the lightweight plastic leg shield into a rigid shield, yet allows the material to retain its flexibility, when the motorcycle is not driven forward. Thus, the rider has the protection of a rigid shield when the motorcycle is being driven forward. Also breakage of the leg shield with resulting sharp projections which could cause injury to the rider is reduced due to the use of lightweight, flexible plastic material. The positioning of the leg shield both farther forward and lower in elevation maintains a safer distance from the rider and provides no interference with maintenance and repair or maneuverability of the motorcycle.

It is therefore an object of the invention to provide a leg shield of novel construction with the above characteristics.

It is a further object to provide a simple and inexpensive means for fixedly mounting said leg shield in combination with the crash bar at each side of the motorcycle by means of spring clamps and rivets or bolts with locknuts, easily adaptable for use in connection with all motorcycles and similar vehicles irrespective of the manufacturer except for minor variations in size of shield and mounting hole locations, and especially useful in touring and commuting types.

The above and other objects and features of advantages of this invention will appear from the following summary and more detailed description thereof.

SUMMARY OF THE INVENTION

According to the present invention, a leg shield having the above characteristics is provided, comprising a sheet of plastic material of predetermined shape and size attached to the crash bar at each side of the motorcycle which blocks the flow of air, wind, dirt, rain, insects, etc. onto the feet, legs and thighs of the rider yet allows for cooling of the engine.

Rigid shields are particularly dangerous should the vehicle overturn. Rigid shields also form a potential means of injuring the rider in case of spill, increases weight and cost of manufacture and reduces sleekness of style.

It is therefore among the objects of the invention to provide a new and improved leg shield for motorcycles and similar vehicles which is flexible and lightweight and inexpensive, aesthetically pleasing, easily mounted and allows freedom of movement to the rider. During commuting or touring, the shield stretches taut allowing for minimal flutter and little wind braking or lateral wind effects or loss of stability.

Another object of the present invention is to provide a leg shield attached at each side and in combination with the crash bar for motorcycles and similar vehicles. The inventive combination comprises a substantially conventional cross bar.

A further object of the present invention is to provide this leg shield fixedly mounted in combination with the crash bar at each side of the motorcycle by means of spring clamps which wrap around said crash bar member and bolts with locknuts.

BRIEF DESCRIPTION OF THE DRAWING

The invention will be more fully understood from the following detailed description in which references may be had to the accompanying illustrative drawings, wherein:

FIG. 1 is a fragmentary front elevation of a motorcycle showing the inventive leg shield in combination with the crash bar;

FIG. 2 is a vertical section taken on the line 2—2 of FIG. 1 showing the inventive leg shield in combination with the crash bar;

FIG. 3 is a vertical section taken on the line 3—3 of FIG. 1.

DETAILED DESCRIPTION OF THE PREFERRED EMBODIMENT

This invention provides a pair of essentially identical, but opposite hand leg shields of unique lightweight design and construction generally symmetrically arranged about a longitudinal center line and secured to the crash bar of the motorcycle. The leg shield is located directly in front of the feet, legs and thighs of the operator and is of sufficient width to prevent to a large extent, the wind striking these members thereby tending to keep them warm during the cold weather. The size and location of the guard also protects the operator from dirt, rain, air, wind, insects, etc. The upper portion of each of the leg shields flare at the outermost corner laterally and upwardly curving aft convexly with respect to the lower planar portion. The arrangement shown requires no relocation of any parts of the motorcycle and permits steering with no interference during commuting or touring. Each leg shield (1) comprises a sheet of plastic material (2), which in the preferred embodiment illustrated in FIGS. 1, 2 and 3 shows five spring type semi-circular clamps (3), each affixed with either two rivets or two bolts with aviation locknuts (4) passing through apertures (5) in the clamps and apertures (6), in the plastic sheet. The locations of these apertures would be distributed to reasonably provide load distribution and enable easy and rapid attachment of said spring tensioned clamps onto and partially encircling the metallic tubular crash bar (7) of the motorcycle, thus providing a method of initial placement of the leg shields. To fixedly connect the leg shield, two additional long bolts (8) with aviation locknuts (9) are shown extending through two additional apertures (10) each of clearance diameter along the inner edge of the leg shield and through apertures (11) at the top and bottom tubular section of the crash bar.

Alternate methods of attachment of the leg shield to the crash bar or other parts of the motorcycle can be used. Ordinary clamps wrapped around the crash bar can be used attached by bolts passing through apertures in the ends of the clamps and also apertures in the leg shield tightened securely with the use of aviation locknuts. Washers or spacers (12) of either fiber or other materials can be used for added insulation and protection.

The shape of the leg shield is relatively arbitrary, the substantially five-sided leg shield illustrated being typical only of the type of leg shields applicable to the present invention.

For the needed combination of flexibility and durability, the sheet may be comprised typically of a plastic such as plexiglass, Durite or the like. Adequate resistance to deformation of the shield from wind pressure is provided by the lifting force which sufficiently tensions the leg shield during riding use.

It will be appreciated from the foregoing description that the inventive combination leg shield and crash bar combines extreme simplicity and low cost of construction with exceptional functionality and attractive appearance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What we claim is:

1. In combination with the crash bar of a motorcycle, a pair of essentially identical, but opposite hand leg shields of unitary plastic construction generally symmetrically arranged about a longitudinal center line and secured to the crash bar of the motorcycle, said shield of sufficient height and breadth to protect the legs, feet and thighs of the operator, said leg shield of planar construction at the lower portion for ease of attachment to the crash bar, but curved convexly aft at the top and outer side, such curvature mainly about a horizontal axis, to especially provide a lifting force to the shield which stiffens the shield to a high degree during riding without the need for beads, stiffeners, strips, bands or the like while maintaining the flexibility of the shield when the motorcycle is not in motion, allowing for especially lightweight and inexpensive construction.

2. The leg shields as set forth in claim 1 in combination with the crash bar of a motorcycle where said leg shield is positioned within the confines of the silhouette of the motorcycle structure such that any overturning of the motorcycle results in no direct impact against the shield itself which reduces greatly the chance of any breakage, splitting, bending or fragmenting of the shield and the resultant injury to the driver.

* * * * *